March 31, 1970         F. W. BENKE         3,504,321
COILS OF SHEET CONDUCTORS HAVING SLOTTED ENDS
Filed Nov. 5, 1968                              3 Sheets-Sheet 1
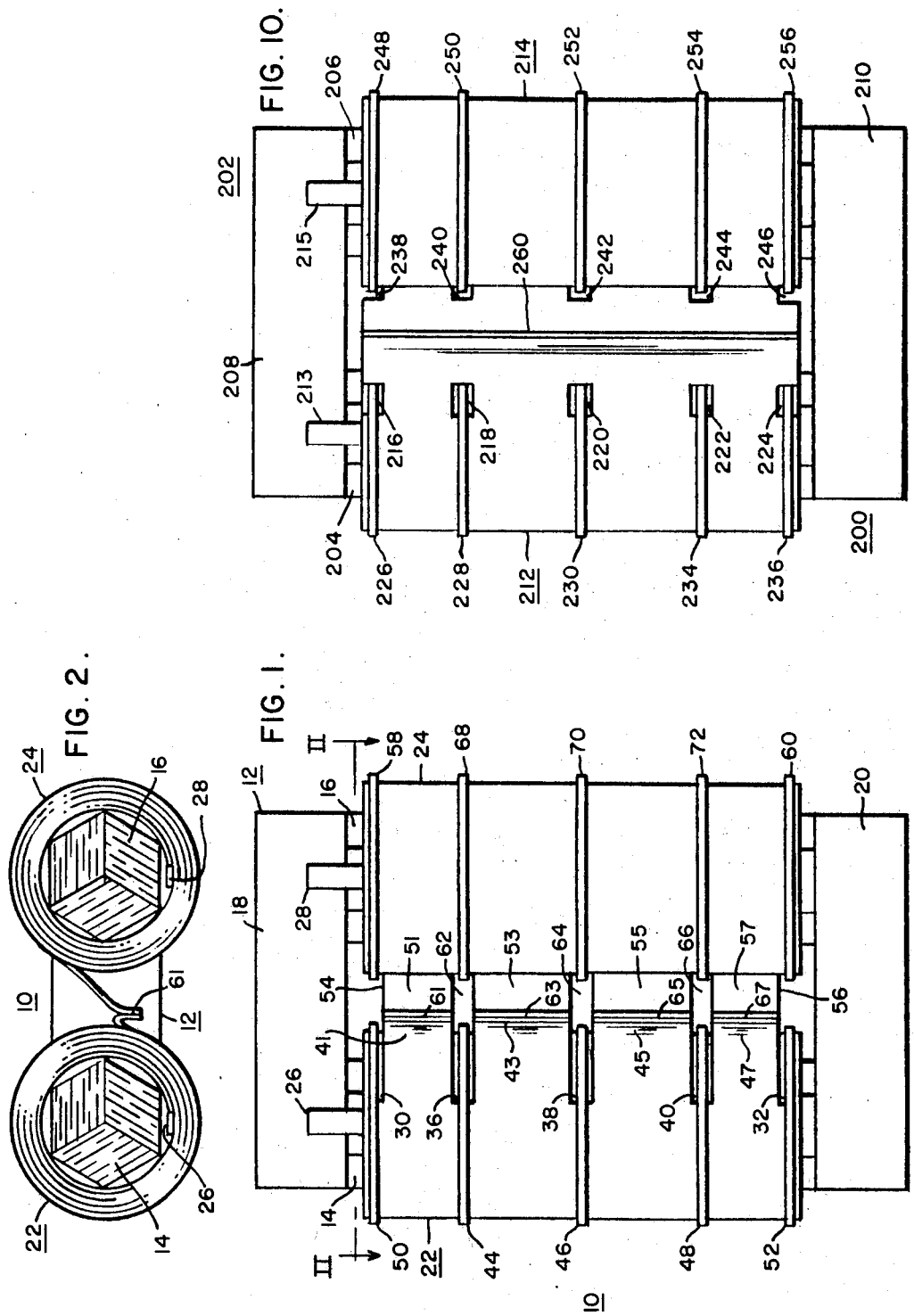

March 31, 1970  F. W. BENKE  3,504,321
COILS OF SHEET CONDUCTORS HAVING SLOTTED ENDS
Filed Nov. 5, 1968  3 Sheets-Sheet 2
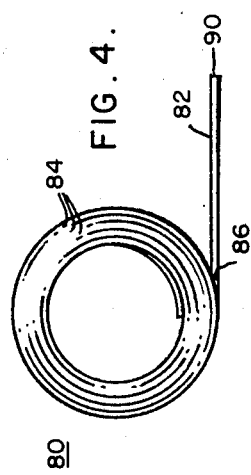
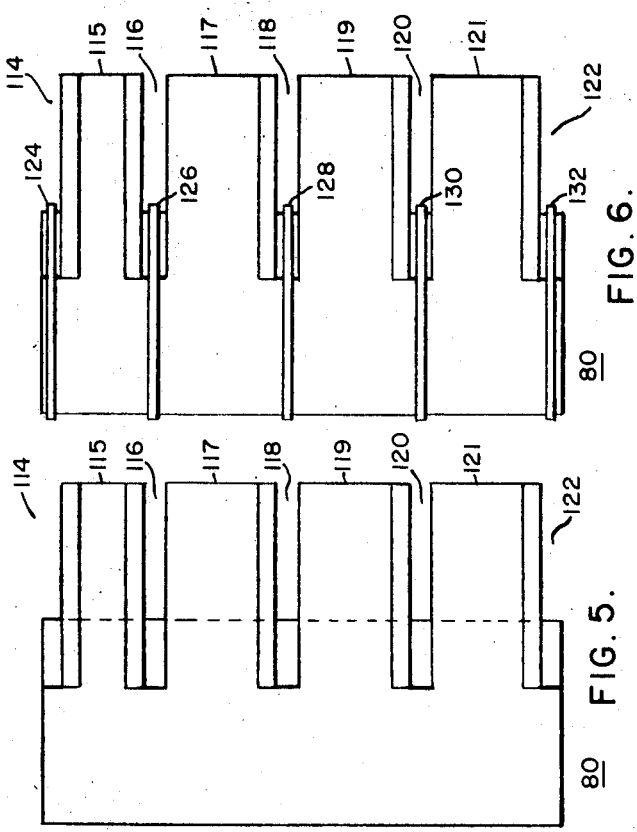
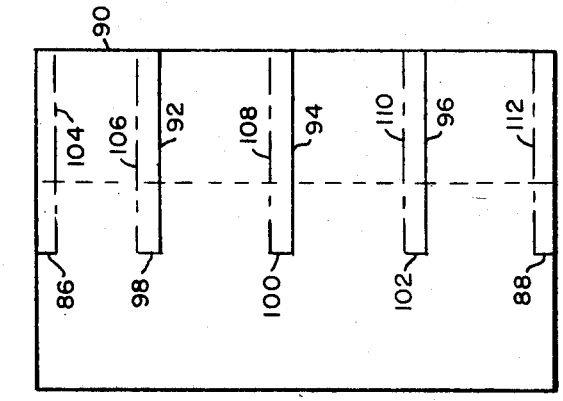

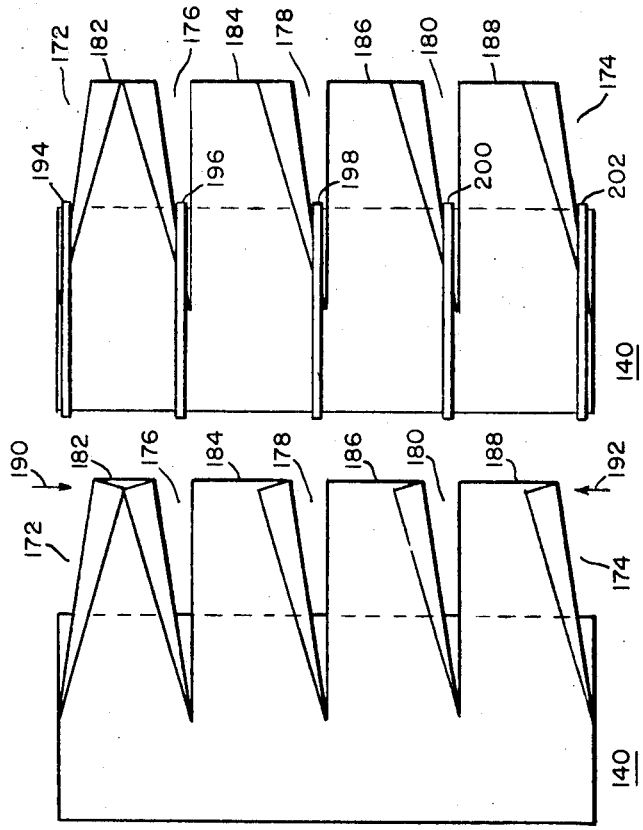
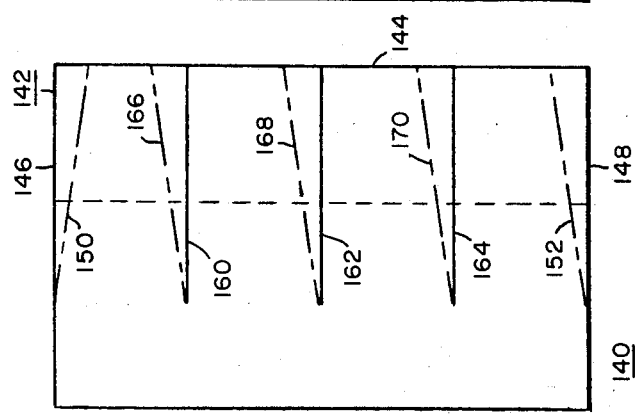

United States Patent Office 3,504,321
Patented Mar. 31, 1970

3,504,321
COILS OF SHEET CONDUCTORS HAVING SLOTTED ENDS
Frank W. Benke, Sharon, Pa., assignor to Westinghouse Electric Corporation, Pittsburgh, Pa., a corporation of Pennsylvania
Filed Nov. 5, 1968, Ser. No. 773,469
Int. Cl. H01f 27/28, 15/10, 7/06
U.S. Cl. 336—184          14 Claims

ABSTRACT OF THE DISCLOSURE

Electrical inductive apparatus including first and second electrical coils formed of sheet conductor. The outer end of the sheet conductor of each coil is slotted to provide terminal means integral with the sheet conductor. The first and second electrical coils are banded at the location of the slots, to maintain their integrity while allowing the terminal means to extend outwardly from the coils. The first and second electrical coils are connected in series by interconnecting the terminal means of the two coils. New and improved methods for constructing the electrical inductive apparatus, and for slotting the sheet conductors to provide the terminal means, are also disclosed.

BACKGROUND OF THE INVENTION

Field of the invention

The invention relates in general to electrical inductive apparatus, such as transformers and reactors, and more particularly to electrical inductive apparatus having coils formed of sheet or strip electrical conductor.

Description of the prior art

Certain electrical inductive apparatus requires that electrical coils formed of sheet or strip conductor be connected in electrical series. For example, certain single-phase power reactors utilize first and second strip wound coils disposed on first and second legs, respectively, of a single-phase magnetic core of the core-form type, with the two coils being connected in electrical series. In the prior art, the series connection is accomplished by welding the outer ends of the strip conductive material of the first and second coils to first and second bus bars, respectively, which extend across the complete width of the strips. A riser is then welded or bolted to each of the first and second bus bars, with the risers extending vertically above the coils, and with another bus bar then being connected to the two risers to form the series connection. The vertical risers and connecting bus bar are supported by a mechanical superstructure disposed above the coils. This arrangement allows the coils to be tightly banded, which is necessary in order to maintain the integrity of the coils when they are subjected to short circuit conditions, and the banding is accomplished without interference from the series connection, as the series connection is made above the coils and not physically between them.

The prior art arrangement for electrically interconnecting strip wound coils has several disadvantages. The transition of the electrical current in the coil from a wide thin sheet or strip conductor to a relatively narrow thick bus-bar provides a non-uniform current distribution in the sheet conductor adjacent the bus bar, and the concentration of the current in the bus bars increases the magnetic field near the tank wall, which increases the losses and may cause overheating of the tank wall. Further, the series connection is costly to manufacture, due to the multiple welding operations which are required, and the superstructure arrangement which is required to support the risers and the interconnection between the risers.

It would be desirable to provide new and improved apparatus and methods for making a series connection between two strip wound coils, which simplifies the connection and reduces its cost, which makes the series connection without a substantial increase in the current density, and which makes the connection without interfering with the banding of the coils.

SUMMARY OF THE INVENTION

Briefly, the present invention discloses a new and improved arrangement for electrically interconnecting strip wound coils of electrical inductive apparatus, such as transformers and reactors. The sheet or strip conductors of which the coils are wound are slotted adjacent their outer ends to provide terminal means which extends from the slots to the outer ends, and the coils are banded at the location of the slots, which maintains the integrity of the coils while allowing the terminal means to extend outwardly from the coils. The outwardly extending terminal means of the adjacent coils are then interconnected, such as by welding, to complete the series connection of the coils. Also disclosed are new and improved methods for constructing electrical inductive apparatus having strip wound coils, and for providing the slots in the strip conductors.

BRIEF DESCRIPTION OF THE DRAWINGS

Further advantages and uses of the invention will become more apparent when considered in view of the following detailed description and drawings, in which:

FIGURE 1 is an elevational view of a single-phase reactor constructed according to the teachings of the invention;

FIG. 2 is a sectional plan view of the reactor shown in FIG. 1, taken along the line II—II;

FIGS. 3 and 4 are elevational and plan views, respectively, of a strip wound coil, illustrating a first step in a method of providing terminals on the end of a strip conductor according to an embodiment of the invention;

FIGS. 5 and 6 are elevational views of the strip wound coil shown in FIGS. 3 and 4, which illustrate additional steps in the method of providing terminal means on the end of a strip wound coil;

FIGS. 7, 8 and 9 are elevational views of a strip wound coil, which illustrate the steps of providing terminal means on the end of a strip wound coil, according to another embodiment of the invention; and FIG. 10 is an elevational view of a single-phase reactor constructed according to still another embodiment of the invention.

DESCRIPTION OF THE PREFERRED EMBODIMENT

Referring now to the drawings, and FIG. 1 in particular, there is illustrated an elevational view of electrical inductive apparatus which may be constructed accordingly to the teachings of the invention. Specifically, FIG. 1 illustrates a single-phase reactor 10, but it will be understood that the teachings of the invention apply broadly to electrical inductive apparatus, such as transformers and reactors, iron core or air core, having strip or sheet wound coils which are serially connected with a connection which is physically located between the two coils, without interfering with the banding means which maintains the integrity of the coils.

FIG. 1 illustrates a reactor 10, without its casing, and FIG. 2 is a sectional plan view of reactor 10, taken along the line II—II. Reactor 10 includes a magnetic core 12 having first and second leg portions 14 and 16, respectively, and upper and lower yoke portions 18 and 20, respectively, which connect the ends of the leg portions to provide a closed magnetic loop. Electrical coils 22 and 24 are disposed in inductive relation with the first and second leg portions 14 and 16 respectively.

Magnetic core 12 is formed of a plurality of stacked metallic, magnetic laminations, such as hot rolled or cold rolled steel, with the leg portions having a cross-sectional configuration dependent upon the coil design. For example, if the coils 22 and 24 are round, the leg portions 14 and 16 may have the hexagonal configuration shown, or a cruciform cross-section. If the coils 22 and 24 are rectangular, the leg portions may also be rectangular.

Coils 14 and 16 are each formed of electrically conductive sheet or strip material, such as copper or aluminum, with the sheet or strip material being wound on a mandrel to provide a coil having the required number of superposed or nested conductor turns, the inner turn of which defines an opening having predetermined dimensions. The turns may be insulated from one another by sheet insulating means wound with the sheet conductor; or, the sheet material may have a coating of electrical insulating means, such as an epoxy resin, disposed on one or both of its major surfaces. Thus, each coil has an axial or longitudinal dimension which is determined by the width of the strip or sheet conductor, an outer diameter determined by the coil opening dimension and the radial build of the conductor turns, and inner and outer ends. The inner ends of coils 22 and 24 are welded, brazed or otherwise electrically connected to bus bars 26 and 28, respectively, which extend across the width of the sheet conductors and extend upwardly where they are brazed or bolted to leads connected to electrical bushings on the reactor casing (not shown).

The outer ends of the strip conductors of coils 22 and 24 are connected together, to connect the coils 22 and 24 in series between the electrical bushings.

In the prior art, the outer ends of the sheet conductor of coils 22 and 24 are each connected to a bus bar, similar to their inner ends, and a riser is connected to each of the bus bars. The series connection is made above the coils, with a bus bar which electrically connects the risers. Since the outer ends of the coils 22 and 24 are adjacent the tank wall, the high current density per inch of width caused by the current flowing through the relatively narrow bus bars may overheat the tank walls, or dictate larger clearances between the tank walls and the outside of the coils, which increases the size, weight and cost of the electrical apparatus. The superstructure for mounting the leads from the insulating bushings to the bus bars 26 and 28 must be modified in the prior art arrangement, to support the series connection which connects the outer ends of the coils.

A series connection between the two strip wound coils, constructed according to the teachings of the invention, does not substantially increase the current density. It is about the same magnitude in the series connection as it is in the strip wound portion of the coils. Further, bus bars are eliminated in the series connection, which eliminates two full coil length welds, and replaces it with a single coil length weld or braze between the strip conductors of the two coils. The risers and their connections to the bus bars are also eliminated, as is the bus bar which interconnects the risers. Since the risers and their interconnecting bus bars are eliminated, the supporting superstructure may be simplified. Further, eliminating the interconnection between the coil which physically occurs above the coils, enables the tank width to be decreased, as additional clearance between wall and the series connection is not required. Therefore, the amount of liquid dielectric required is reduced, which reduces the weight and cost of the apparatus.

Specifically, FIGS. 1 and 2 illustrate electrical coils 22 and 24, electrically interconnected according to the teachings of the invention, with the electrical interconnection being physically made between the coils, without interfering with the banding of the coils, which is required to maintain their integrity, especially under short circuit conditions. The outer ends of the electrical coils may be connected, and the coils will provide a magnetomotive force in a magnetic core which will be additive, if both coils are wound in the same direction. For example, as shown in the plan view of the reactor 10 in FIG. 2, each coil may be wound counterclockwise, starting from the inner end of the coils. If the instantaneous direction of the current is into bus bar 26 of coil 22, the current direction in coil 22 will be counterclockwise, and the current will enter the outer end of coil 24, with the instantaneous direction of current in coil 24 being clockwise. The magnetomotive force in leg portions 14 and 16 is, therefore, in opposite directions, which aid each other in the core loop.

The electrical interconnection of the coil ends is physically located between the coils, without affecting the banding of the coils, by providing slots in the outer ends of the sheet conductors of which the coils are wound, to provide a like numbered plurality of terminals on the outer end of each coil. The slots are substantially parallel with the sides of the sheet conductors, with the number of slots depending upon the number of bands required to adequately hold the coils and maintain their configuration under short circuit conditions. The length of the slots is determined by the required length of the terminals. The coils may be banded at the location of the slots, while allowing the terminals to extend outwardly from the coils, and adjacent terminals on the two coils may be welded, or otherwise electrically joined to complete the series connection of the coils.

More specifically, electrical coil 22 is narrowed adjacent its two sides, at least by the width of the banding means, as illustrated at 30 and 32 in FIG. 1, with the narrowed portion starting at the extreme outer end of the sheet conductor and extending for a predetermined dimension along the sides of the coil. The outer end of the strip conductor is then slotted, with a plurality of slots which are spaced across the axial dimension of the coil 22, or across the width of the sheet conductor, such as every ten to twelve inches, providing a plurality of slots 36, 38 and 40, and a plurality of terminals 41, 43, 45 and 47, which are integral with the sheet conductor. The width of a slot is at least equal to the width dimension of the banding means, and the length of the slots is substantially the same predetermined dimension that the sides of the strip were narrowed. The predetermined length dimensions of the slots is that dimensions which will allow banding means to extend through the slot to tightly band the coil, while providing a terminal length which is sufficient to allow like positioned terminals on the coils to be interconnected.

After the outer end of coil 22 is slotted, banding means 44, 46, 48, 50 and 52 are disposed about the circumference of the coil at the axially spaced locations of the slots 36, 38 and 40, and at the narrowed ends 30 and 34 of the strip, respectively. The banding means may be any suitable tape or strap having the strength necessary to tightly band the coil and prevent it from moving during short circuit stresses, such as an epoxy or polyester impregnated glass tape. Three superposed layers of epoxy impregnated glass tape having a width of 1 inch have been found to provide the required strength. After coil 22 is banded, it may be dried in a forced air circulated oven at a temperature of 125–140° C., which will also cure the resin impregnated tape.

Coil 24 is prepared in a manner similar to coil 22, with the sides of the strip adjacent the outer end thereof being narrowed at 54 and 56 to allow banding means 58 and 60 to be applied at the axial ends of the coil, and with the outer end of the strip conductor being slotted to provide slots 62, 64 and 66 through which banding means 68, 70 and 72 proceed. The slot locations on coil 24 are similar to the slot locations on coil 22, providing terminals 51, 53, 55 and 57 on coil 24 which are axially located similar to terminals 41, 43, 45 and 47, respectively, of coil 22.

After coils 22 and 24 are banded and dried, and the banding means has been cured, they are telescoped over leg portions 14 and 16, respectively, of magnetic core 12, which is partially assembled to the point prior to placing the upper yoke portion on the upstanding leg portions. The outwardly extending ends of adjacent terminals on coils 22 and 24 may then be connected to one another, such as by welding, with terminals 41 and 51 being connected together at weld 61, terminals 43 and 53 being connected together at weld 63, terminals 45 and 55 being connected together at weld 65, and terminals 47 and 57 being connected together at weld 67. The terminals may be welded at their edges by aligning the ends of the terminals, as best shown in FIG. 2, or by any other suitable joining method. The upper yoke may then be placed in position on the upstanding leg portions 14 and 16. The end frames for holding the magnetic core-winding assembly in assembled relation are not shown, in order to simplify the drawings. The magnetic core-winding assembly may then be placed in a suitable tank or casing, which may be filled to a predetermined level with a fluid dielectric such as oil, and the terminals 26 and 28 may then be connected to the inner end of suitable electrical insulating bushings, disposed through the tank or casing.

The slots in the outer ends of the strip wound coils may be provided by making a plurality of cuts at predetermined locations, parallel with the sides of the strip material, and then removing the strip material disposed between certain of the cuts. For example, the slots in coils 22 and 24 may be provided by making first, second, third, fourth, fifth, sixth, seventh and eighth parallel cuts at predetermined spaced locations, starting at the upper side of the strip, and by removing the material between the upper side of the strip and the first cut, between the second and third cuts, between the fourth and fifth cuts, between the sixth and seventh cuts, and between the eighth cut and the bottom side of the strip material.

The minor amount of material removed between the cuts will not cause hot spots to develop, because the slots and the series connections are made outside of the coils, and are therefore very efficiently cooled by the fluid dielectric in the casing. The slots, however, may be provided without removing any material from the strip conductor, by cutting and folding the strip material in a predetermined pattern. FIGS. 3, 4, 5 and 6 illustrate a method of providing the slots in a strip wound coil, according to one embodiment of the invention, and FIGS. 7, 8 and 9 illustrate another method of providing the slots, both of which cut and fold the strip material with little or no removal of the strip material being required.

More specifically, FIGS. 3 and 4 are elevational and plan views, respectively, of a strip wound coil 80, formed of a strip or sheet conductor 82, which is wound about a mandrel to provide a plurality of superposed conductor turns 84. The strip conductor 82 is cut perpendicular to its sides at cuts 86 and 88, with the cuts intersecting the sides and extending inwardly for at least the width of the banding tape which is used to band the coils. Cuts 86 and 88 may also be made at some angle with the sides which is other than 90 degrees, if desired. The dimension of the cuts 86 and 88 from the end 90 of the strip conductor 82 is that dimension which will allow the coil 82 to be banded and still provide an outwardly extending terminal of sufficient length to allow it to be joined to a similar outwardly extending terminal from an adjacent strip wound coil.

The strip conductor 82 is then cut inwardly from its end 90 at cuts 92, 94, and 96, with these cuts being substantially parallel to the sides of the strip conductor. Cuts 98, 100 and 102 are then made which start at the inner ends of cuts 92, 94 and 96, respectively, and which make a predetermined angle with these cuts, such as 90 degrees. Cuts 98, 100 and 102 may be similar in length and orientation to cuts 86 and 88. Thus, cuts 92 and 98, 94 and 100, and 96 and 102, form continuous composite cuts, each having a first portion parallel with the sides of the strip conductor 82, and a connected second portion which may be perpendicular to the sides of the strip conductor. The ends of the cuts 86, 98, 100, 102 and 88 are used to locate fold or bend lines, which extend parallel with the sides of the strip conductor 82 to the end 90 of the strip. Thus, bend lines 104, 106, 108, 110 and 112 extend from the ends of cuts 86, 98, 100, 102 and 88, respectively, to the end 90 of the strip or sheet conductor. The strip is folded along the bend lines 104, 106, 108, 110 and 112 as shown in FIG. 5, to provide slots 114, 116, 118, 120 and 122, respectively, and terminals 115, 117, 119 and 121. The coil is then banded at the location of the slots, as shown in FIG. 6, with banding means 124, 126, 128, 130 and 132, respectively. The folded material may be returned to its original position after the coil is banded, which would allow adjacent coils to be connected with a continuous weld, or, the folds may be retained, and adjacent coils joined at the plurality of terminals.

FIGS. 7, 8 and 9 are elevational views of a strip wound coil 140 formed of a strip 142 of electrically conductive material, having an outer end 144 and sides 146 and 148. FIGS. 7, 8 and 9 illustrate the steps of still another method of providing slots in a strip conductor by cutting and folding. In this embodiment of the invention, only one straight line cut is required for each inner slot, and the outer "slots" or narrowing of the strip adjacent its sides are provided without cutting the strip material. The sides 146 and 148 of the strip material 142 are narrowed to provide open sided "slots" by folding the sides 146 and 148 along bend lines 150 and 152, respectively, which lines start at the sides 146 and 148 and angle inwardly at a predetermined angle relative to the sides of the strip conductor. The predetermined angle is selected to provide a terminal of predetermined length from the point where the banding means will cross the fold in the strip conductor to the end 44 of the strip.

The slots in the strip are provided by spaced cuts 160, 162 and 164, which start at the end 144 of the strip conductor 142 and extend inwardly in parallel relation with the sides of the strip, to the point where the folds 150 and 152 intersect the sides of the strip conductor. Bend lines 166, 168 and 170 start at the inner ends of cuts 160, 162 and 164, and angle outwardly therefrom at the same predetermined angle that the bend lines 150 and 152 make with the sides of the strip conductor. The strip 142 is then folded along bend lines 150, 166, 168, 170 and 152, to provide "slots" 172 and 174 at the sides 146 and 148, respectively, of the strip, and slots 176, 178 and 180, which create terminals 182, 184, 186 and 188, as shown in FIG. 8. This construction allows two strip wound coils to be interconnected without an increase in current density.

Instead of providing the inner slots in the strip conductor by cutting along lines which are parallel with the sides of the strip, and folding along lines which are not parallel with the sides of the strip, the strip may be cut along the angular lines and folded along the parallel lines, with similar results.

To facilitate welding terminals 182, 184, 186 and 188 to like position terminals of an adjacent strip wound coil, the ends of the terminals may be trimmed along a line which extends between arrows 190 and 192, as shown in FIG. 8, which produces the terminal structure shown in FIG. 9. FIG. 9 further illustrates the step of banding the coil 140 with banding means 194, 196, 198, 200 and 202 at the location of slots 172, 176, 178, 180 and 174, respectively. It will be noted from FIG. 9 that the banding means crosses the folds, allowing a terminal length which extends from the crossing point to the end of the strip material.

In the embodiments of the invention hereinbefore described, the "slotting" of the strip conductor provides slots which extend completely to the end of the strip conductor, providing a plurality of terminals which are electrically joined to terminals of like axial location on an adjacent strip wound coil. The invention should not be limited to this arrangement, however, as slots may also be provided in the strip material which do not extend completely to the end of the strip conductor, which allows two adjacent strip wound coils to be interconnected with a single continuous weld between the two outer ends of the strip from which the two coils are wound. FIG. 10 illustrates this embodiment of the invention, with FIG. 10 being an elevational view of a single-phase reactor 200. Reactor 200 is similar in construction to the reactor 10 shown in FIGS. 1 and 2 and hereinbefore described, except for the method and arrangement of making the series connection between the coils.

Reactor 200 includes a magnetic core 202 having leg portions 204 and 206, and yoke portions 208 and 210 which interconnect the upper and lower ends of the leg portions 204 and 206. First and second strip wound coils 212 and 214 are disposed in inductive relation with leg portions 204 and 206, respectively, with each of the coils having inner ends connected to bus bars or terminals 213 and 215, and outer ends which are interconnected with a continuous edge butt weld 260.

Strip wound coil 212 is provided with slots 216, 218, 220, 222 and 224, which are axially spaced across the width of the strip conductor, and which extend for a predetermined length, terminating before they reach the end of the strip conductor. Slots 216, 218, 220, 222, and 224, allow banding means 226, 228, 230, 234 and 236 to extend threthrough, tightly encircling the coil 212 while allowing a portion of the strip conductor to extend outwardly therefrom and provide a single terminal means at the end of the coil. The discrete slots should be made wide enough and long enough to allow the roll of banding tape to pass therethrough when the coil is being banded, and the distance from the end of the slots to the end of the sheet conductor should be sufficient to obtain the necessary terminal length, which extends outwardly from the outer coil surface.

In like manner, coil 214 is provided with a plurality of spaced slots 238, 240, 242, 244 and 246 across the width of the sheet conductor, which slots also terminate a predetermined distance from the end of the sheet conductor. Banding means 248, 250, 252, 254 and 256 extend through the slots 238, 240, 242, 244 and 246 respectively, to tightly band the coil 214 and maintain its integrity, while allowing a portion of the strip conductor to extend outwardly from the surface of the coil and provide terminal means suitable for connection to coil 212.

The construction shown in FIG. 10 has the advantage of requiring a single continuous weld connection between the two coils, instead of a plurality of connections. The construction shown in FIG. 10 may also be used to completely eliminate the weld 260 between the two coils, by winding coil 212, providing the discrete slots 216, 218, 220, 222 and 224 in the sheet conductor of the coil, and banding the coil with the banding means, without severing the strip conductor. The necessary amount of strip conductor to wind coil 214 may then be gathered, and coil 214 wound, still without severing the sheet conductor, providing a continuous homogeneous connection between the two coils. Coil 214 may then be provided with the discrete spaced slots, and banded through the slot openings. The two coils may then be telescoped over winding leg portions 204 and 206 of the magnetic core 202.

In summary, there has been disclosed new and improved arrangements and methods for serially connecting two strip wound coils disposed adjacent one another, which improves the apparatus electrically and mechanically, while reducing its cost. The coils are connected with a joint which is physically disposed between the coils, instead of a connection which extends outwardly from the coil ends, eliminating the brazing or welding of a bus bar to the end of each electrical coil, eliminating the risers connected to the bus bars, and eliminating the bus bar which interconnects the risers, as well as simplifying the superstructure disposed above the magnetic core-winding assembly. The disclosed arrangement provides a more uniform current distribution at the series connection between the coils, and it reduces losses and heating of the tank walls. Further, since special clearance does not have to be provided between the series connection and the tank walls, as required by prior art arrangements, the tank may be made smaller with resulting savings in weight and cost.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A method of electrically interconnecting electrical coils formed of sheet conductor, while maintaining their integrity, comprising the steps of:

providing first and second electrical coils formed of sheet conductor, each having an outer end, providing a plurality of spaced slots across the width of the sheet conductor of each coil, which have a predetermined length, banding the first and second electrical coils about their circumference at the location of the slots, to maintain the integrity of the coils while allowing the outer ends of the strip conductors to extend outwardly from the coils to provide terminal means, and electrically interconnecting the terminal means of the first and second electrical coils.

2. The method of claim 1 wherein the spaced slots terminate before reaching the outer ends of the sheet conductors, providing a single terminal means at the outer end of each electrical coil.

3. The method of claim 1 wherein the spaced slots extend to the ends of the sheet conductor, providing a plurality of spaced terminals integral with the sheet conductor of each coil, with the plurality of terminals of the first coil being connected to the plurality of terminals of the second coil.

4. The method of claim 1 wherein the slotting step includes cutting the outer ends of the first and second electrical coils to provide a plurality of spaced cuts parallel with the sides of the sheet conductor, and removing the sheet material between certain of the spaced cuts, and between certain of the cuts and the sides of the sheet conductor.

5. The method of claim 1 wherein the slotting step includes cutting the outer ends of the first and second electrical coils in a predetermined pattern, and folding certain of the cut edges to provide spaced slots in the sheet conductors while maintaining the original quantity of sheet conductor material.

6. The method of claim 5 wherein the predetermined pattern of cuts in the outer ends of each of the first and second electrical coils includes cuts which start at the sides of the sheet conductors, and extend inwardly for a predetermined dimension, and composite cuts which have a first portion starting at the ends of the sheet conductors and which extends inwardly for a predetermined dimension, and a second portion which starts at the finish of the first portion and extends outwardly therefrom for a predetermined dimension, and wherein the folding of the sheet conductors starts at the ends of the cuts which intersect the sides of the sheet conductors, and at the ends of the second portion of the composite cuts, with the fold lines extending to the ends of the sheet conductors.

7. The method of claim 5 wherein the predetermined pattern of cuts in the outer ends of each of the first and second electrical coils includes cuts which start at the ends of the sheet conductors and which extend inwardly for a predetermined dimension, and wherein the folding of the sheet conductors folds the corners of their outer ends, and at least one edge of each of the cuts.

8. Electrical inductive apparatus comprising:
   first and second electrical coils formed of sheet conductor having inner and outer ends, said first and second electrical coils being disposed in adjacent relation, with their axes being parallel,
   said first and second electrical coils having a plurality of spaced slots across the width of their sheet conductors, adjacent their outer ends,
   banding means disposed about each of said first and second electrical coils at the location of the spaced slots, to maintain the integrity of said first and second electrical coils while allowing a portion of the sheet conductor to extend outwardly from the coils to provide terminal means,
   and means electrically connecting said terminal means of said first and second electrical coils, to connect said first and second electrical coils in series.

9. The electrical inductive apparatus of claim 8 wherein the spaced slots start a predetermined dimension from the ends of the sheet conductor, to provide a single terminal at the outer end of each sheet conductor.

10. The electrical inductive apparatus of claim 8 wherein the spaced slots extend to the ends of the sheet conductor, to provide a plurality of terminals at the ends of the sheet conductor which are integral therewith.

11. The electrical inductive apparatus of claim 10 wherein adjacent terminals of the first and second electrical coils are interconnected.

12. The electrical inductive apparatus of claim 11 wherein at least one longitudinal edge of each terminal is defined by a fold line, with the folded material extending for a predetermined dimension away from the fold line.

13. The electrical inductive apparatus of claim 12 wherein the predetermined dimension of the folded material is uniform along its longitudinal dimension.

14. The electrical inductive apparatus of claim 12 wherein the predetermined dimension of the folded material changes along its longitudinal dimension.

References Cited

UNITED STATES PATENTS

| | | | |
|---|---|---|---|
| 2,246,167 | 6/1941 | D'Entremont | 336—184 XR |
| 2,374,018 | 4/1945 | Johnson | 336—184 |
| 2,436,207 | 2/1948 | D'Entremont | 336—184 XR |
| 2,580,208 | 12/1951 | Wiegand | 336—184 XR |

THOMAS J. KOZMA, Primary Examiner

U.S. Cl. X.R.

29—605; 336—192, 223